United States Patent [19]
Hahn et al.

[11] Patent Number: 6,072,694
[45] Date of Patent: Jun. 6, 2000

[54] ELECTROLYTIC CAPACITOR WITH IMPROVED LEAKAGE AND DISSIPATION FACTOR

[75] Inventors: Randolph S. Hahn, Greensville; Philip M. Lessner, Simpsonville; Veeriya Rajasekaran, Greenville, all of S.C.

[73] Assignee: Kemet Electronics Corporation, Greenville, S.C.

[21] Appl. No.: 09/163,318

[22] Filed: Sep. 30, 1998

[51] Int. Cl.[7] .................................................. H01G 9/15
[52] U.S. Cl. .................... 361/523; 361/502; 361/509; 361/528; 361/529; 429/209; 429/214; 429/245; 429/215
[58] Field of Search ........................ 361/525, 502, 361/508, 509, 528, 529; 252/500; 29/25.03; 205/317; 429/209, 214, 215, 245

[56] References Cited

U.S. PATENT DOCUMENTS

| | | | |
|---|---|---|---|
| 4,805,074 | 2/1989 | Harakawa et al. | 361/525 |
| 5,187,650 | 2/1993 | Kudoh et al. | 361/525 |
| 5,424,907 | 6/1995 | Kojima et al. | 361/532 |
| 5,621,608 | 4/1997 | Arai et al. | 361/525 |
| 5,729,428 | 3/1998 | Sakata et al. | 361/512 |
| 5,824,434 | 10/1998 | Kawakami et al. | 429/209 |

FOREIGN PATENT DOCUMENTS

| | | |
|---|---|---|
| 52-79255 | 7/1977 | Japan . |
| 60-37114 | 2/1985 | Japan . |
| 2-74021 | 3/1990 | Japan . |
| 2-219211 | 8/1990 | Japan . |
| 3-64013 | 3/1991 | Japan . |
| 3-285321 | 12/1991 | Japan . |
| 4-73924 | 3/1992 | Japan . |

*Primary Examiner*—Kristine Kincaid
*Assistant Examiner*—Mohamed ElGazzar
*Attorney, Agent, or Firm*—Banner & Witcoff, Ltd.

[57] ABSTRACT

The adhesion of a conductive polymer film to an oxidized porous pellet anode is improved by the incorporation of a silane coupling agent in the polymer impregnating solution. The incorporation of the silane coupling agent also decreases leakage current and dissipation factor. Suitable silanes are those of the general formula $(R^1-R^3)-Si-(OR^2)_3$. Each of $R^2$ and $R^3$ is a $C_1-C_6$ alkyl group such as methyl, ethyl, or propyl. $R^1$ can be chosen from a wide variety of organic functional groups such as epoxy, glycidoxy, amino, and pyrrole. The most preferred silane is 3-glycidoxypropyltrimethoxysilane.

7 Claims, No Drawings

ELECTROLYTIC CAPACITOR WITH IMPROVED LEAKAGE AND DISSIPATION FACTOR

FIELD OF THE INVENTION

This invention relates to solid electrolytic capacitors and methods for fabricating the same, and more particularly to solid electrolytic capacitors in which conductive polymers are used as solid electrolytes and which have a low equivalent series resistance.

BACKGROUND OF THE INVENTION

A solid state electrolytic capacitor is made from a porous pellet of sintered tantalum powder, a dielectric tantalum oxide layer formed on the surface of the sintered tantalum powder, a solid-state conductor impregnated into the volume of the pellet, and external connections such as silver paint, etc. The tantalum forms the positive electrode of the capacitor, and the solid-state conductor forms the negative electrode (also called the cathode or counter-electrode).

Manganese dioxide has been utilized as the cathode of choice for solid tantalum capacitors since the commercial introduction of this style of capacitor in the early 1950's. A key property of manganese dioxide is its self-healing ability. At defective portions of the dielectric film, the manganese dioxide becomes non-conductive. This is due to the manganese dioxide transforming to a lower manganese oxide because of joule heating at the defect site. This mechanism allows capacitors with low leakage currents to be produced. It also allows small dielectric defects that occur during manufacture and use to be isolated. However, if the dielectric defect is too large, the dielectric can crack. Manganese dioxide is a powerful oxidizing agent. When it comes in direct contact with tantalum through a crack in the oxide, the capacitor can ignite, leading to destruction of the capacitor and possible destruction of other components in the circuit. It is desirable to replace the manganese dioxide with a solid-state conductor that does not cause the tantalum to ignite while maintaining the self-healing ability.

The use of tantalum capacitors in high frequency circuits has become more important. This has led to the need for tantalum capacitors having low equivalent series resistance (ESR). The best manganese dioxide has a resistivity of 0.5 to 10 ohm-cm. It is desirable to replace the manganese dioxide with a solid-state conductor that has a lower resistivity. However, many highly conductive metals and oxides do not have a self-healing ability and thus are not suitable for solid-state tantalum capacitors.

Conductive polymers such as polypyrroles, polyanilines, and polythiophenes have resistivities 10 to 100 times less than that of manganese dioxide. Since they are much less powerful oxidizing agents than manganese dioxide, these materials do not cause the capacitor to ignite upon failure. Polypyrrole was shown to have a self-healing mechanism (Harada, NEC Technical Journal, 1996). Due to these favorable properties of conductive polymer compounds, these compounds are being investigated as possible replacement materials for manganese dioxide in solid-state tantalum capacitors.

Three methods have been used to deposit the conductive polymer in the porous tantalum pellet:

1. Chemical oxidative polymerization;
2. Electrolytic oxidative polymerization; and
3. Deposition of a polymer from solution followed by oxidation and/or doping.

In chemical oxidative polymerization, a monomer, an oxidizing agent, and a dopant are reacted inside the porous pellet to form the conductive polymer. Monomers include pyrrole, aniline, thiophene, and various derivatives of these compounds. The oxidizing agent can be either an anion or a cation. Typical anion oxidizers are persulfate, chromate, and permanganate. Typical cations are Fe(III) and Ce(IV). The best dopants are anions of strong acids such as perchlorate, toluenesulfonate, dodecylbenzenesulfonate, etc. The reaction between monomer, oxidizing agent, and dopant can take place in a solvent such as water, an alcohol, a nitrile, or an ether.

Several methods have been used to get the monomer, oxidizing agent, and dopant into the porous pellet and carry out the conversion to conductive polymer. In one method, the pellet is first dipped in a solution of the oxidizing agent and dopant, dried, and then dipped in a solution of the monomer. After the reaction is carried out, the pellet is washed and then the process is repeated until the desired amount of polymer is deposited in the pellet. In this method, it is difficult to control the morphology of the final polymer. It is also difficult to control the exact reaction stoichiometry between the monomer and the oxidizing agent. Control of this stoichiometry is critical to achieve the highest conductivity polymer (Satoh et al., Synthetic Metals, 1994). Cross contamination of the dipping solutions is a problem. Since the pellet must be dipped twice for each polymerization, the number of process steps is greatly increased. The excess reactants and the reduced form of the oxidizing agent need to be washed out of the part. This adds even more process steps and complexity to the process.

In a related method, the sequence is reversed so that the pellet is dipped in the monomer solution first and the solvent is evaporated away. The pellet is then dipped in the oxidizing agent/dopant solution and the reaction is carried out. This method suffers from all the disadvantages of the previous method. In addition, some monomer may be lost in the solvent evaporation step.

In yet another method, all components are mixed together and the pellet is dipped in the combined solution. This method reduces the number of dips and allows more precise control over the reaction stoichiometry. However, the monomer and oxidizing agent can react in the dipping bath, causing premature polymerization and loss of reactants. This adds some additional complexity and cost to the process. This is especially a problem with pyrrole monomer and Fe(III) oxidizing agents. To overcome this problem to some extent, the dipping bath can be kept at cryogenic temperature (Nishiyama et al., U.S. Pat. No. 5,455,736). However, use of cryogenic temperatures adds considerable equipment and operational complexity to the process. The pyrrole/Fe(III) can be replaced with a monomer/oxidizing agent combination that is less reactive; for example, 3,4-ethylenedioxythiophene and an Fe(III) salt of an organic acid (Jonas et al., U.S. Pat. No. 4,910,645).

In electrolytic oxidative polymerization, the monomer is oxidized to polymer at an electrode and the dopant is incorporated from the electrolyte. This polymerization method produces high conductivity polymer films. There is no chemical oxidizer to wash out of the film after polymerization.

Direct electrolytic oxidation of monomer to polymer is difficult because of the high resistance dielectric oxide layer. Various methods have been proposed to circumvent this problem. One method is to form the polymer on the tantalum and then to form the oxide layer (Saiki et al., U.S. Pat. No. 5,135,618). In another method, the polymer and the oxide layer are formed at the same time (Saiki et al., European Patent Application 0 501 805 A1). However, the electrolytes best suited for depositing conductive polymer and tantalum oxide films are quite different; therefore, these methods produce neither an optimum polymer nor an optimum oxide.

Another method is to deposit a thin film of conductive material by chemical methods, followed by contacting this layer with an electrode to carry out the electrolytic oxidative polymerization. Manganese dioxide prepared by pyrolysis of manganese nitrate (Tsuchiya et al., U.S. Pat. No. 4,943,892), manganese dioxide prepared by pyrolysis of permanganate (Kudoh et al., J. Power Sources, 1996), and conductive polymer prepared by chemical oxidative polymerization (Yamamoto et al., Electronics and Communications in Japan, 1993) have been used for this thin layer. Contacting this thin layer of conductive material with an auxiliary electrode is difficult to achieve in practice. Thus, Tsuchiya et al. propose bridging the anode lead to the conductive layer. This bridging layer must be removed after depositing the polymer by electrolytic oxidative polymerization. A complicated series of insulating washers under the bridging layer is used to accomplish this. Kojima et al. (U.S. Pat. No. 5,071,521) propose contacting the thin conductive layer with an auxiliary electrode. Use of an auxiliary electrode greatly increases process complexity, especially with sintered pellet-type anodes where an individual electrode must be provided for each individual anode. Contacting the layer with an auxiliary electrode can cause damage to the oxide layer.

In principle, direct deposition of polymer from solution involves dipping the capacitor in the polymer solution and then evaporating the solvent away to form a conductive film. This operation would be repeated several times to deposit the required amount of polymer in the pellet. This strategy would reduce the number of process steps compared to the chemical oxidative polymerization approach and would eliminate the cumbersome auxiliary electrodes used in the electrolytic oxidative polymerization approach. However, capacitance efficiency is poor with this process due to the difficulty of impregnating small pores with a liquid containing a dispersed solid phase.

Furthermore, technical limitations on conductive polymer solutions prevent this ideal process from being achieved in practice. For example, polyaniline is soluble in NMP in the emereldine base form (PANI-EB), but not in the doped form. A solution of PANI-EB is impregnated into a pellet followed by solvent evaporation to leave a low-conductivity PANI-EB film. The pellet must then be further soaked in a solution of a dopant to change the film into the conducting emereldine salt (ES) form. This doping reaction takes a considerable amount of time, and the excess dopant must be washed from the pellet. In addition, PANI-EB solutions are very viscous in concentrations above 5 wt % and tend to gel with standing. Thus, Sakata et al. (U.S. Pat. No. 5,457,862) state that PANI-EB in NMP can only be used to coat the outside of the porous pellet and is not suitable for internal impregnation. Even after doping, the resistivities of PANI-ES prepared using this method are only about 1 ohm-cm.

To avoid the gelling problem, Abe et al. (U.S. Pat. No. 5,436,796) use a solution of polyaniline in the leuco emereldine base form (PANI-LEB). This allows higher concentrations of PANI to be used without the problems of gelling, and the ultimate resistivity is lower. However, in order to be converted into the conducting PANI-ES form, the PANI-LEB films must be oxidized and doped inside the capacitor pellet. The oxidizing/dopant reaction takes a considerable amount of time, and both the excess dopant and excess oxidizer mush be washed from the pellet.

Despite the considerable research and development efforts to capitalize on the intrinsic advantages of conductive polymer electrodes, devices manufactured with these materials have been met with only limited commercial success. The application of stable, continuous, highly conductive, adherent films to interior and exterior surfaces of porous anodes presents numerous technical challenges. One of the difficulties associated with conductive polymer solid electrolytes is poor adherence between the dielectric oxide and the conductive polymer, particularly following exposure to high humidity environments. As a consequence of the poor adhesion between dielectric oxide and solid polymer electrolyte, capacitance efficiency is reduced. Capacitance efficiency is defined as the ratio of the dry capacitance of the capacitor following application of the solid electrolyte to the capacitance of the capacitor as measured in a suitable wet electrolyte prior to the application of the solid electrolyte coating. Capacitance efficiencies less than 1.0 increase the cost of manufacturing tantalum capacitors, since additional tantalum is required to obtain the desired capacitance. The continuing market trend toward miniaturization of electronic components places a premium on capacitance efficiency since a larger anode is required to compensate for capacitance loss.

Poor adhesion of the polymer film to the external surfaces of the porous tantalum anode result in cracking and peeling, creating a discontinuous exterior polymer film. Application of silver paint to a cracked exterior film leads to a high leakage current. Poor adhesion of the polymer film to the tantalum oxide dielectric surfaces can also cause an increase in dissipation factor of the capacitor. A method to improve adhesion of the conductive polymer film to the dielectric surfaces is thus highly desirable.

The use of organosilanes to serve as coupling agents between oxides such as those of aluminum, zirconium, titanium, tin, and nickel and organic phases is reported by Arkles ("Tailoring Surfaces with Silanes," *Chemtech* 7, 766, 1977). Wu et al., writing in *Chemistry of Materials*, Volume 9, Number 2, February 1977, reported improved adhesion between polyaniline and glass slides. The glass surface was modified through application of an amino silane prior to deposition of polyaniline on the glass substrate. Sato et al. claim improved adhesion of polypyrrole to anodized aluminum films in Japanese Patent Number 09246106. Sato et al. disclose the use of silane coupling agents as a pretreatment, but do not teach the incorporation of silanes into the polymerization solution.

Sakata et al. (U.S. Pat. No. 5,729,428) describe a solid electrolytic capacitor having a valve action metal body, an oxide film as a dielectric from oxidizing the metal body, an electron donor organic layer formed from an organic compound having an electron donor group, and a conductive polymer layer as a solid electrolyte layer covering the entire surface of the electron donor organic compound. Sakata et al. also teach two ways of making the electron donor organic layer in the capacitor which uses conductive polymers as solid electrolytes, and a method for making the capacitor.

The electron donor organic layer taught by Sakata et al. may be comprised of fatty acids, aromatic carboxylic acids, anionic surface active agents, phenol and its derivatives, hydrolysates of silane coupling agents, titanium coupling agents, or aluminum coupling agents which covers the entire surface of the oxide film with a thickness of a monolayer to several layers. Sakata et al. describe suitable silanes which include 3-glycidoxypropyltrimethoxysilane.

Sakata et al. disclose forming the electron donor organic layer by either contacting the oxide with the vapor of the electron donor organic compound or dipping the oxidized anode in an alcohol solution of the electron donor compound (specifically a 2 wt % solution of 3-glycidoxypropyltrimethoxysilane in methanol). The reference also teaches that the water in aqueous solutions tends to react with the oxide, thus preventing the coupling agent's reaction (although the silane agents will allow formation of a thin film when contained in an acidic aqueous solution).

Sakata et al. disclose that the purpose of the electron donor organic is to increase adhesion between the oxide and conductive polymer, thereby preventing reduction of electrostatic capacitance and preventing deterioration in dissipating factor at high temperatures. Sakata et al. also warn to keep the electron donor organic layer thickness minimal as increased thickness leads to increased equivalent series resistance and reduced electrostatic capacitance, but do not teach incorporating the silane into the polymerization solution.

SUMMARY OF THE INVENTION

It is an object of the present invention to decrease the dissipation factor (DF) of solid electrolytic capacitors impregnated with conductive polymer counter electrodes.

It is another object of the present invention to decrease the equivalent series resistance (ESR) of solid electrolytic capacitors impregnated with conductive polymer counter electrodes.

It is yet another object of the present invention to decrease the leakage current of solid electrolytic capacitors impregnated with conductive polymer counter electrodes.

It is a further object of the present invention to improve the adhesion between metal oxides and conductive polymers.

In one aspect of the invention, a solid electrolytic capacitor comprises:

(a) a porous pellet anode;

(b) a dielectric oxide film formed by oxidizing a surface of the porous pellet;

(c) a conductive polymer counter electrode adhered to the oxide film, the conductive polymer having a silane coupling agent incorporated therein.

In another aspect of the invention, a process for preparing a solid electrolytic capacitor having a conductive polymer counter electrode comprises:

(a) providing an oxidized porous capacitor pellet;

(b) dipping the pellet in a solution comprising a solvent, a monomer, an oxidizing agent, a dopant, and a silane coupling agent; and (c) applying heat to the pellet so as to evaporate the solvent, thereby forming a conductive polymer film having the silane coupling agent incorporated therein.

The porous pellet may be made from tantalum, aluminum, niobium, titanium, zirconium, hafnium, or alloys of these elements, and preferably is made from tantalum. Suitable monomers for preparing conductive polymers include pyrrole, thiophene, and derivatives thereof. The preferred monomer is 3,4 ethylenedioxythiophene. Suitable solvents include ketones and alcohols, and preferably a mixed solvent of 1-butanol and 2-propanol is used. Oxidants for the polymerization of thiophenes and pyrroles include Fe(III) salts of organic and inorganic acids, alkali metal persulfates, ammonium persulfates, and others. The preferred oxidant is Fe(III) tosylate. Preferably p-toluenesulfonate is used as a dopant. The most preferred silane is 3-glycidoxypropyltrimethoxysilane.

It was found that the incorporation of a silane coupling agent in the polymer impregnating solution unexpectedly improves the adhesion of the polymer film to the oxidized porous anode and unexpectedly decreases leakage current and dissipation factor of the capacitor.

DETAILED DESCRIPTION OF THE INVENTION

A porous pellet is prepared, for example, by pressing charged powder and sintering to form a porous body. Preparation of porous pellets is well known in the art, for example as taught by U.S. Pat. No. 5,729,428 to Sakata et al., incorporated by reference herein in its entirety. The pellet may be made from any suitable material such as tantalum, aluminum, niobium, titanium, zirconium, hafnium, or alloys of these elements. Tantalum is the preferred material.

The porous pellet can be of any size that is suitable for producing a surface mount or leaded-style capacitor. The porous pellet body typically has a thickness of about 0.5 mm to 3 mm, a width of about 0.9 mm to 5 mm, and a length of about 1 mm to 5.5 mm.

An oxide film is then formed on the pellet. The oxide film may be formed using any suitable electrolyte solution such as a phosphoric acid or phosphate-containing solution. A voltage of from about 14 V to about 150 V is applied. The formation voltage ranges from 2.5 to 4.5 times the rated voltage of the part and more preferably from 3 to 3.5 times the rated voltage of the part.

After the oxide film is formed, the pellet is immersed in an impregnating solution. The impregnating solution contains a monomer, an oxidizing agent, a dopant, and a silane coupling agent. The selection of a suitable solvent for the solution is well within the level of skill in the art. Examples of solvents include ketones and alcohols such as acetone, pyridine, tetrahydrofuran, methanol, ethanol, 2-propanol, and 1-butanol. Preferably, a solvent of 1-butanol and 2-propanol mixed at a ratio of from about 1:15 to about 1.2:1, preferably about 1:2, is employed.

The monomer concentration may be from about 1.5 wt % to about 8 wt %, more preferably is from about 4 wt % to about 8 wt %, and most preferably is about 6 wt %. Suitable monomers for preparing conductive polymers include but are not limited to aniline, pyrrole, thiophene, and derivatives thereof. Monomers for preparing conductive polymers are well known in the art, for example as taught by U.S. Pat. No. 4,910,645 to Jonas et al., incorporated by reference herein. The preferred monomer is 3,4 ethylenedioxythiophene.

The oxidizing agent concentration may be from about 6 wt % to about 45 wt %, more preferably is from about 16 wt % to about 42 wt %, and most preferably is about 24 wt %. Oxidizing agents for preparing conductive polymers are well known in the art. U.S. Pat. No. 4,910,645, for example, teaches various oxidants for the polymerization of thiophenes and pyrroles, which oxidants include Fe(III) salts of organic and inorganic acids, alkali metal persulfates, ammonium persulfates, and others. The preferred oxidant is Fe(III) tosylate.

The dopant concentration may be from about 5 wt % to about 30 wt %, more preferably is from about 12 wt % to about 25 wt %, and most preferably is about 21 wt %. Any suitable dopant may be used, such as dodecylbenzenesulfonate, p-toluenesulfonate, or chloride. The preferred dopant is p-toluenesulfonate.

The silane concentration may range from about 0.25 wt % to about 10 wt %, more preferably is from about 0.5 wt % to about 4 wt %, and most preferably is from about 0.5 wt % to about 2 wt %. Deionized water may be added to the solution for the purpose of causing the hydrolysis of alkoxy groups to silanol groups. Preferably, the deionized water concentration is from about 0.5 wt % to about 3 wt %, more preferably about 1 wt %.

Suitable silanes are those of the general formula $(R^1—R^3)—Si—(OR^2)_3$ as taught by Edwin P. Plueddemann, *Silane Coupling Agents*, Plenum Press (1982). Each of $R^2$ and $R^3$ is a $C_1–C_6$ alkyl group, more preferably methyl, ethyl, or propyl. $R^3$ is most preferably propyl. $R^1$ can be chosen from a wide variety of organic functional groups such as epoxy, glycidoxy, amino, and pyrrole. The most preferred silane is 3-glycidoxypropyltrimethoxysilane.

The anodized pellets are dipped in the impregnating solution and then cured at a temperature of from about 65° C. to about 160° C., more preferably from about 80° C. to about 120° C., most preferably about 110° C., followed by washing in deionized water or another solvent. A lower silane concentration (i.e., 0.5 wt %) used in the initial dips (i.e., the first 6 dips) is effective for reducing dissipation factor and equivalent series resistance. The silane concentration may be increased for subsequent dips (i.e., to 1 wt % for dips 7–12), and increased further (i.e., to 2 wt %) for applying the external polymer coating in order to effectively reduce leakage current.

EXAMPLES

The following illustrative examples are provided for a better understanding of the invention. These examples are illustrative of preferred aspects of the invention and are not intended to limit the scope of the invention Example 1

Tantalum powder of charge 26,000 CV/g was pressed into pellets and sintered to form a porous body of dimensions 0.81 mm thick, 2.92 mm wide, and 3.94 mm long. The pellets (anodes) were sintered and then anodized in a phosphoric acid electrolyte to 28 volts.

Three impregnating solutions containing 3,4-ethylenedioxythiophene monomer, Fe(III) oxidizer, and p-toluenesulfonate dopant were prepared. The first solution contained 4 wt % monomer, 16 wt % iron toluenesulfonate, 16 wt % butanol, and the balance 2-propanol. One-half gram of 3-glycidoxypropyltrimethoxysilane and 2 grams of deionized water were added per 100 grams of the impregnating solution. The second solution was identical to the first solution except the concentration of 3-glycidoxypropyltrimethoxysilane was increased to 1 gram per 100 grams of solution. The third solution contained 6 wt % monomer, 24 wt % iron toluenesulfonate, 24 wt % butanol, and the balance 2-propanol. Two grams of 3-glycidoxypropyltrimethoxysilane and 2 grams of deionized water were added per 100 grams of impregnating solution number 3.

A group of anodes were repetitively dipped in the first impregnating solution and cured. The anodes were washed in 80° C. deionized water and dried after each cure cycle. The anodes were processed through a series of 6 such steps for each impregnating solution. Following the final impregnation cycle the anodes were microscopically examined. A continuous, adherent film was observed covering the entire exterior dielectric surface of the anodes. Following application of a silver paint layer to the exterior of the anodes the capacitance, dissipation factor, equivalent series resistance, and leakage current of the devices were recorded.

Comparative Example 1

Capacitors were prepared from the same lot of anodes as in Example 1. A 95 volume percent solution of 2-propanol in 5 percent deionized water was prepared. Two grams of 3-glycidoxypropyltrimethoxysilane were added per 100 grams of the alcohol-water solution. The anodized anodes were dipped in the silane solution for 1 minute. The anodes were dried in a forced convection oven at 110° C. for 10 minutes. Four- and six weight percent monomer solutions were prepared in which the monomer (3,4-ethylenedioxythiophene), oxidizer (Fe(III)), and dopant (p-toluenesulfonate) were mixed together in the ratios provided in Example 1. A conductive polymer film of poly-(3,4-ethylenedioxythiophene) was applied to the anodes through a chemical oxidative polymerization process as described in Example 1. Following application of the conductive polymer film the anodes were microscopically examined. The external film was cracked and peeling, revealing areas of bare dielectric surface. Following the microscopic examination the anodes were dipped in a silver paint, and the capacitance, dissipation factor, equivalent series resistance, and leakage currents were recorded. Table 1 compares performance between capacitors having the silane pretreatment coating with those having silane incorporated in the impregnating solution.

TABLE 1

Silane Pretreatment vs. Silane Incorporation in Impregnating Solution

| Sample | Batch Number | Average Cap ($\mu F$) | Average DF (%) | Average ESR (ohms) | Average Leakage ($\mu A$) |
|---|---|---|---|---|---|
| Silane Pretreatment | N1365-12A | 45.3 | 2.90 | 0.189 | 1.55 |
| Silane Incorporation | N1365-12P | 47.3 | 2.31 | 0.147 | 0.45 |

Wherein "cap" is capacitance, "DF" is dissipation factor, and "ESR" is equivalent series resistance.

Example 2

A group of anodized pellets as described in Example 1 was impregnated with a conductive polymer film of poly-(3,4-ethylenedioxythiophene). This impregnation was accomplished though a chemical oxidative polymerization process in which the monomer (3,4-ethylenedioxythiophene), oxidizer (Fe(III)), and dopant (p-toluenesulfonate) were mixed together in an impregnating solution as described above. The monomer concentration in this solution was 4 wt %. The ratio of oxidizer and dopant to monomer for this 4 wt % solution was identical to that utilized in the 6 wt % solution described in Example 1. A series of 12 impregnating dips was applied to coat the interior surfaces of the dielectric with the conductive polymer.

To determine the effect of the addition of silane to the final dips on the leakage current, the anodes were split into 2 groups for application of 6 wt % dips to build up the exterior film thickness. One group of anodes was treated with an impregnating solution with the composition as in Example 1. The other group of anodes was treated with an impregnating solution containing no silane. Following application of the exterior polymer coat, silver paint was applied and the DC leakage of each group was measured. These results are presented in Table 2 below.

TABLE 2

Capacitor Performance with Silane in External Polymer Coating Solution

| Silane Concentration (wt %) | Water Concentration (wt %) | # of Additional Dips | Cap ($\mu F$) | DF (%) | ESR (ohms) | Leakage Current ($\mu A$) |
|---|---|---|---|---|---|---|
| 2 | 1 | 6 | 46.12 | 3.28 | 0.092 | 0.465 |
| 2 | 1 | 12 | 45.49 | 3.14 | 0.097 | 0.639 |
| 0 | 0 | 6 | 47.58 | 3.46 | 0.090 | 1.344 |
| 0 | 0 | 12 | 47.56 | 3.43 | 0.102 | 2.214 |

Wherein "cap" is capacitance, "DF" is dissipation factor, and "ESR" is equivalent series resistance. The data clearly indicate that leakage current was reduced by incorporation of the 3-glycidoxypropyltrimethoxysilane in the solution used to apply the external polymer coating.

Example 3

In order to test the effect of incorporating 3-glycidoxypropyltrimethoxysilane into the impregnating solution for the initial dips, another experiment was run using anodes prepared as in Example 1. The anodes were dipped 12 times in a 4 wt % impregnating solution as described in Example 2. A silane concentration of 0.5 wt % was used for the initial six dips (all impregnating solutions containing silane also contained 1% deionized water). A silane concentration of 1 wt % was used for dips 7–12. A silane concentration of 2 wt % was used in the 6 wt % dips added to provide an external polymer coating. For comparison, a group of anodes from the same lot was impregnated with solutions containing no silane. The data for the experiment is in Table 3.

These data demonstrate that incorporating silane into the conductive polymer impregnating solution for the initial dips reduces DF and ESR. As in the previous example, leakage current was reduced by addition of silane to the 6 wt % solutions used to provide an external polymer coat for the capacitor.

TABLE 3

Capacitor Performance with Silane Incorporated in Initial Dips

| Silane Concentration in Dips 1–6 (4% monomer) | Silane Concentration in Dips 7–12 (4% monomer) | Silane Concentration in 6% Dips | Cap (µF) | dF (%) | ESR (ohms) | Leakage Current (µA) |
|---|---|---|---|---|---|---|
| 0 | 0 | 0 | 48.8 | 2.89 | 0.173 | 2.68 |
| 0.5 | 1 | 2 | 47.5 | 2.31 | 0.147 | 0.451 |

Wherein "cap" is capacitance, "DF" is dissipation factor, and "ESR" is equivalent series resistance.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A solid electrolytic capacitor comprising:
   (a) a porous pellet anode;
   (b) a dielectric oxide film formed by oxidizing a surface of the porous pellet; and
   (c) a conductive polymer counter electrode adhered to the oxide film the conductive polymer having a silane coupling agent incorporated therein.

2. The solid electrolytic capacitor of claim 1 wherein the porous pellet is made from a material selected from the group consisting of tantalum, aluminum, niobium, titanium, zirconium, hafnium, and alloys thereof.

3. The solid electrolytic capacitor of claim 1 wherein the silane coupling agent is of the general formula $(R^1-R^3)-Si-(OR^2)_3$, wherein $R^1$ is selected from the group consisting of epoxy, glycidoxy, amino, and pyrrole; and $R^2$ and $R^3$ are each $C_1-C_6$ alkyl.

4. The solid electrolytic capacitor of claim 3 wherein $R^2$ is selected from the group consisting of methyl, ethyl, and propyl, and wherein $R^3$ is propyl.

5. The solid electrolytic capacitor of claim 1 wherein the silane coupling agent is 3-glycidoxypropyltrimethoxysilane.

6. The solid electrolytic capacitor of claim 1 wherein the conductive polymer is selected from the group consisting of polyaniline, polythiophene, polypyrrole, and derivatives thereof.

7. The solid electrolytic capacitor of claim 1 wherein the conductive polymer is poly-(3,4 ethylenedioxythiophene).

* * * * *